United States Patent
Gomi et al.

(10) Patent No.: US 7,901,124 B2
(45) Date of Patent: Mar. 8, 2011

(54) LIGHT GUIDE MEMBER, PLANAR LIGHT SOURCE DEVICE USING THE LIGHT GUIDE MEMBER, AND DISPLAY APPARATUS

(75) Inventors: Shuji Gomi, Chiba (JP); Kenji Shinozaki, Chiba (JP); Shuichi Naijo, Chiba (JP); Takeo Watanabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 292 days.

(21) Appl. No.: 12/092,678

(22) PCT Filed: Nov. 2, 2006

(86) PCT No.: PCT/JP2006/322419
§ 371 (c)(1),
(2), (4) Date: May 5, 2008

(87) PCT Pub. No.: WO2007/052842
PCT Pub. Date: May 10, 2007

(65) Prior Publication Data
US 2009/0284956 A1  Nov. 19, 2009

Related U.S. Application Data

(60) Provisional application No. 60/735,872, filed on Nov. 14, 2005, provisional application No. 60/752,892, filed on Dec. 23, 2005, provisional application No. 60/797,775, filed on May 5, 2006.

(30) Foreign Application Priority Data

| Nov. 4, 2005 | (JP) | 2005-321285 |
| Dec. 16, 2005 | (JP) | 2005-363239 |
| Apr. 27, 2006 | (JP) | 2006-123742 |

(51) Int. Cl.
G02B 6/10 (2006.01)

(52) U.S. Cl. ......... 362/616; 362/561; 362/560; 362/97.2

(58) Field of Classification Search .................. 362/616, 362/612, 625, 626, 561, 560, 551, 511, 330, 362/97.1–97.3, 310
See application file for complete search history.

(56) References Cited

U.S. PATENT DOCUMENTS 6,447,133 B1  9/2002  Eschke et al.
(Continued)

FOREIGN PATENT DOCUMENTS

| JP | 3-112731 U | 11/1991 |
| JP | 10-511223 A | 10/1998 |

(Continued)

OTHER PUBLICATIONS

Shibata, Hirokazu, "Heat Dissipation Mechanism of LED Backlight 'Triluminos'," Techno-Frontier Symposium 2005, Apr. 20, 2005, pp. G3-3-1 to G3-3-4.

Primary Examiner — Sandra L O Shea
Assistant Examiner — Leah S Lovell
(74) Attorney, Agent, or Firm — Sughrue Mion, PLLC

(57) ABSTRACT

A light guide member in which a light that has entered one major face from an illuminant is emitted from the other major face, includes a cut portion provided with a specified face inclined toward the other face at a section of one major face that faces the illuminant, and a reflecting portion, which reflects a light emitted from the illuminant, on the inclined face.

34 Claims, 11 Drawing Sheets

U.S. PATENT DOCUMENTS

| | | | |
|---|---|---|---|
| 6,742,907 B2 * | 6/2004 | Funamoto et al. | 362/625 |
| 2002/0097578 A1 | 7/2002 | Greiner | |
| 2006/0146573 A1 * | 7/2006 | Iwauchi et al. | 362/621 |

FOREIGN PATENT DOCUMENTS

| | | |
|---|---|---|
| JP | 11-203925 A | 7/1999 |
| JP | 2001-067917 A | 3/2001 |
| JP | 2001-210122 A | 8/2001 |
| JP | 2002-231037 A | 8/2002 |
| JP | 2004-079461 A | 3/2004 |
| JP | 2004-111189 A | 4/2004 |
| JP | 2004-117413 A | 4/2004 |
| JP | 2004-206916 A | 7/2004 |
| JP | 2004-247207 A | 9/2004 |
| JP | 2005-203225 A | 7/2005 |
| WO | 2004/055429 A1 | 7/2004 |

* cited by examiner

LIGHT GUIDE MEMBER, PLANAR LIGHT SOURCE DEVICE USING THE LIGHT GUIDE MEMBER, AND DISPLAY APPARATUS

CROSS REFERENCE TO RELATED APPLICATIONS

This application is an application filed under 35 U.S.C. §111(a) claiming benefit pursuant to 35 U.S.C. §119(e)(1) of the filing date of Provisional Application 60/735,872 filed on Nov. 14, 2005, 60/752,892 filed on Dec. 23, 2005, and 60/797,775 filed on May 5, 2006 pursuant to 35 U.S.C. §111(b).

TECHNICAL FIELD

The present invention relates to a light guide member (plate), a planar light source device using the light guide member (plate), and a display apparatus that are used in the case in which an illuminant such as a light emitting diode is used as an illuminant of a back light for a liquid crystal.

BACKGROUND ART

Conventionally, the main stream of such a back light illuminant for a liquid crystal display has been the so-called edge light type in which a cold cathode tube is disposed on the edge face of the chassis (for instance, see the Patent Document 1).

FIG. 14 illustrates a conventional back light illuminant of the edge light type using a cold cathode tube.

More specifically, for this back light illuminant, the back light consists of a cold cathode tube 102 which is a thin linear luminous device and a light guide plate 106 for spreading a light emitted from the cold cathode tube 102 out in a sheet shape and for emitting the light toward a liquid crystal panel 104. A light that has been emitted from the cold cathode tube 102 enters a plane for incident light 108 of the light guide plate 106 and travels toward a plane 114 opposite to the plane for incident light 108 while repeating a total reflection on an emitting plane 110 and a reflecting plane 112 of the light guide plate 106.

The reflecting plane 112 is provided with, for instance, an uneven shape, which is composed of a light guide portion for guiding a light toward the plane 114 and a reflecting portion for reflecting a light toward the emitting plane 110.

Consequently, in the case in which a light that has entered the plane for incident light 108 reaches the reflecting portion on the reflecting plane 112, the light is reflected toward the emitting plane 110, and is supplied to the liquid crystal panel 104 through the emitting plane 110.

On the other hand, a light that has reached the light guide portion on the reflecting plane 112 is totally reflected and is guided toward the plane for incident light 108 or the plane 114 opposite to the plane for incident light 108.

However, such an edge light type display apparatus has a limitation in improving a luminance and a uniformity in the luminance, and it is difficult to meet the requirement of an enlargement of a display screen.

Therefore, an adoption of a direct lighting type light has been examined for a large size liquid crystal display in recent years.

However, in the case in which the above described cold cathode tube 102 is used as a direct lighting type light, since the cold cathode tube 102 is comparatively large, a thickness of a liquid crystal display is enlarged. In addition, there are problems that color reproducibility and a response for the cold cathode tube 102 is not satisfactory, and that an after-image phenomenon occurs.

In recent years, a luminous efficiency of a solid luminous device has been extremely improved, and an application of the solid luminous device to an illumination is being progressed. In particular, among such solid luminous devices, it has been examined to use a light emitting diode (LED: Light Emitting Diode) as a back light illuminant (planar light source) for a liquid crystal display.

In the case in which there is used a light emitting diode as a back light illuminant for a liquid crystal display, the requirement of an enlargement of a display screen can be satisfied. In addition, the satisfactory color reproducibility and a high speed response can be implemented, and it is expected that a high quality display be achieved.

FIG. 15 is a schematic cross sectional view for showing a configuration of a direct lighting type planar light source device (back light) using light emitting diodes disposed directly below a conventional liquid crystal display panel 134 disclosed in the Non Patent Document 1.

In the planar light source device 120, an LED substrate (mounting substrate) as a substrate (not shown) in which a plurality of light emitting diodes 122 are disposed as an illuminant in an array pattern is formed on a bottom face 126 of a chassis 124. Moreover, the bottom face and inside faces of the chassis are covered by a reflecting sheet 128. Furthermore, a diffusing plate 130 and a prism sheet 132 are disposed in the range of 1 to 5 cm in general apart from the light emitting diodes 122.

In the case in which a light is emitted from the light emitting diode 122, the emitted light travels directly toward the diffusing plate 130, or is reflected by the reflecting sheet 128 and travels toward the diffusing plate 130. The emitted light is then diffused in the diffusing plate 130, and is inclined in a vertical direction by passing through the prism sheet 132. The emitted light then enters a liquid crystal panel 134. Lights emitted from different light emitting diodes 122 are mixed in a space between the light emitting diodes and the diffusing plate 130. The mixing is then accelerated by the diffusion in the diffusing plate 130, thereby implementing a uniform luminance. In general, a luminance of the section directly over the light emitting diodes 122 is higher than that of other sections. Therefore, a uniformity in a luminance can be further improved by increasing a diffusion degree at the section over the diffusing plate 130 directly over the light emitting diode.

In the conventional planar light source device using the light emitting diode, the diffusing plate 130 is disposed and the diffusing plate 130 is apart from the light emitting diodes in order to uniform a luminance and a chromaticity as described above. However, even in such a case, there is a problem that a luminance of the section directly over the light emitting diodes becomes higher.

In the case in which a color mixture is carried out by using light emitting diodes of a plurality of colors (RGB) in particular (without using a monochromatic light emitting diode), there are problems that a color mixture is insufficient and an unevenness of colors may be found in some cases. Accordingly, to reduce an unevenness of luminance and an unevenness of colors, a diffusion degree of the section directly over the light emitting diodes is further increased by using the diffusing plate as described above, or a so-called lighting curtain is disposed directly over the light emitting diodes in order to reduce a luminance of the section directly over the light emitting diodes in some cases.

However, the above means cause a utilization efficiency of a light to be lowered. Moreover, in the case in which the diffusing plate is made further apart from the light emitting diodes, an unevenness of luminance and an unevenness of colors can be reduced. However, this method causes a thickness of a back light to be enlarged, and is not preferable for a flat panel display.

Patent Document 1: Japanese Laid-Open Patent Publication No. 2004-117413

Non Patent Document 1: TECHNO-FRONTIER SYMPOSIUM 2005, Thermal Design and Countermeasure Technology Symposium, Issue Date: Apr. 20, 2005 (Japan Management Association), Session G3: Latest Design Case of Heat Radiation Mounting I (pp. G3-3-1 to G3-3-4)

DISCLOSURE OF THE INVENTION

Problems to be Solved by the Invention

The present invention was made in consideration of such conditions, and an object of the present invention is to provide a light guide member, a planar light source device, and a display apparatus that are capable of implementing a uniform luminance on inside faces by reducing an unevenness of luminance caused by a higher luminance at the section directly over a light emitting diode in the case in which the light emitting diode is used for instance, and capable of contributing to a miniaturization of the planar light source device (back light).

Means for Solving the Problems

To solve the above problems, the present inventors have created a light guide member, a planar light source device using the light guide member, and a display apparatus related to the present invention.

More specifically, the present invention involves the following modes (1) to (35) for instance.

(1) A light guide member in which a light that has entered one major face from an illuminant is emitted from the other major face, is characterized by comprising:
a cut portion provided with a specified face inclined toward the other face at a section of one major face that faces the illuminant, and
a reflecting portion, which reflects a light emitted from the illuminant, on the inclined face.

(2) A light guide member as defined in above (1) is characterized in that the illuminant is a light emitting diode.

(3) A light guide member as defined in above (1) or (2) is characterized in that the illuminant comprises a plurality of elements and the inclined face is the inclined face of the cut portion formed on one major face of the light guide member linearly in lines in such a manner that the cut portion can cover some of a plurality of the elements.

(4) A light guide member as defined in above (1) or (2) is characterized in that the illuminant comprises a plurality of elements and the inclined face is the inclined face of the cut portion formed on one major face of the light guide member in such a manner that a plurality of the cut portions is formed in a scattered condition at a specified pitch and each cut portion faces each element.

(5) A light guide member as defined in above (3) or (4) is characterized in that the cut portion has an almost triangular cross section, in which a specified inclined face is formed only in one direction.

(6) A light guide member as defined in above (3) or (4) is characterized in that the cut portion has a cross section almost M shaped and has an angle shape, in which specified inclined faces are formed in two directions.

(7) A light guide member as defined in any one of above (3) to (6) is characterized in that the cut portion is sealed with a resin.

(8) A light guide member as defined in any one of above (1) to (7) is characterized by further comprising a reflecting portion for reflecting a light on the bottom face that faces the illuminant.

(9) A planar light source device is characterized by comprising:
the light guide member as defined in any one of above (1) to (8),
an illuminant, and
a substrate on which the illuminant is disposed.

(10) A display apparatus is characterized by comprising the planar light source device as defined in above (9) as a back light.

(11) A display apparatus as defined in above (10) is characterized in that a display portion is a liquid crystal panel.

(12) A light guide member as defined in above (1) is characterized by further comprising:
a plurality of divided members adjacently disposed in such a manner that contiguous side faces face to each other for forming one light guide member in a plate shape,
a cut portion in the divided member, which is provided with a specified inclined face at a position that faces the illuminant,
a reflecting portion on the inclined face, which reflects a light emitted from the illuminant,
a first small end face in the divided member, which is a plane facing a contiguous divided member, and
a light diffusion portion on the first end face.

(13) A light guide member as defined in above (12) is characterized in that the cut portion is formed in an edge portion facing the first small end face in the divided member.

(14) A light guide member as defined in above (13) is characterized in that the inclined face formed in the cut portion of the divided member is formed from a position between the top and bottom in a direction of a thickness of the divided member in such a manner that the inclined face is connected to a second small end face of the divided member.

(15) A light guide member as defined in above (12) is characterized in that the illuminant is a light emitting diode.

(16) A light guide member as defined in above (12) is characterized in that the illuminant comprises a plurality of elements and the cut portion is formed linearly in lines in such a manner that the cut portion can cover some of a plurality of the elements.

(17) A light guide member as defined in above (12) is characterized in that the illuminant comprises a plurality of elements and a plurality of the cut portions is formed in a scattered condition at a specified pitch in such a manner that each cut portion faces each element.

(18) A light guide member as defined in any one of above (12) to (17) is characterized in that the cut portion is sealed with a resin.

(19) A light guide member as defined in above (12) is characterized by further comprising a reflecting portion for reflecting a light on the bottom face of the divided member.

(20) A planar light source device is characterized by comprising:
the light guide member as defined in any one of above (12) to (19),
an illuminant, and
a substrate on which the illuminant is disposed at a specified pitch.

(21) A display apparatus is characterized by comprising the planar light source device as defined in above (20) as a back light.
(22) A display apparatus as defined in above (21) is characterized in that a display portion is a liquid crystal panel.
(23) A light guide member as defined in above (1) is characterized by further comprising:
a plurality of divided members adjacently disposed in such a manner that contiguous side faces face to each other for forming one light guide member in a plate shape, wherein first side faces opposite to each other in each of a plurality of the divided members have almost a parallelogram shape, and
a reflecting portion, which reflects a light emitted from the illuminant, on at least one face of second side faces opposite to each other in each of a plurality of the divided members.
(24) A light guide member as defined in above (23) is characterized in that the second side faces opposite to each other in each of a plurality of the divided members have an almost rectangular shape.
(25) A light guide member as defined in above (23) is characterized in that the second side faces opposite to each other in each of a plurality of the divided members have almost a parallelogram shape.
(26) A light guide member as defined in above (25) is characterized by further comprising a reflecting portion, which reflects a light emitted from the illuminant, on at least one face of the first side faces opposite to each other in each of a plurality of the divided members.
(27) A light guide member as defined in above (23) is characterized by further comprising a reflecting portion, which reflects a light, on one major face of the divided member.
(28) A light guide member as defined in above (23) is characterized by further comprising a reflecting portion, which reflects a light emitted from the illuminant, on the both faces of the second side faces opposite to each other in each of a plurality of the divided members.
(29) A light guide member as defined in above (26) is characterized by further comprising:
a reflecting portion, which reflects a light emitted from the illuminant, on the both faces of the second side faces opposite to each other in each of a plurality of the divided members, and
a reflecting portion, which reflects a light emitted from the illuminant, on the both faces of the first side faces opposite to each other in each of a plurality of the divided members.
(30) A light guide member as defined in above (23) is characterized in that the illuminant is a light emitting diode.
(31) A planar light source device is characterized by comprising:
the light guide member as defined in any one of above (23) to (30),
an illuminant, and
a substrate on which the illuminant is disposed.
(32) A light guide member as defined in above (31) is characterized in that the illuminant is disposed in the range included in a projection region of the second side face of a plurality of the divided members.
(33) A planar light source device is characterized by comprising:
the light guide member as defined in any one of above (25), (26), and (29),
an illuminant, and
a substrate on which the illuminant is disposed,
wherein the illuminant is disposed in the range included in a projection region of the first side face and a projection region of the second side face of a plurality of the divided members.
(34) A display apparatus is characterized by comprising the planar light source device as defined in any one of above (31) to (33) as a back light.
(35) A display apparatus as defined in above (34) is characterized in that a display portion is a liquid crystal panel.

Effect of the Invention

According to a light guide member related to the present invention, since a light irradiated upward from an illuminant can be reflected in a horizontal direction by a reflecting face in a cut portion, an amount of transmitted lights from the upper face of the cut portion can be reduced. As a result, the light guide plate related to the present invention can contribute to a uniformity in the total luminance and chromaticity in the case in which the light guide member is used for a planar light source device or the like.

Moreover, according to a planar light source device using such a light guide member, since a luminance at the section directly over an illuminant is reduced, a marked gap of a conspicuously luminescent spot or a chromaticity can be prevented.

Since the light guide member is configured by a plurality of divided members, it is easy to accommodate to the device with a larger size. Furthermore, a maintenance property is excellent in the case in which one or some divided members are damaged.

Here, according to the configuration in which the divided member is provided with a light diffusion portion at a facing plane, since a light reflected in a horizontal direction by an inclined face passes through the light diffusion portion, the light can be a white light with further less unevenness of colors.

Moreover, according to the configuration in which first side faces opposite to each other in each of a plurality of the divided members have almost a parallelogram shape, and in which a reflecting portion, which reflects a light emitted from the illuminant, is formed on at least one face of second side faces opposite to each other in each of a plurality of the divided members, a light reflected in a horizontal direction by the above inclined face is supplied to the emitting face side by a reflecting portion directly formed on the other inclined face (the second side face) facing and opposite to one inclined face (the second side face) of the divided member and/or by a reflecting portion formed on one inclined face (the second side face) of a contiguous divided member that faces the other inclined face (the second side face), and can be emitted as a white light with less unevenness of luminance.

In particular, by using the planar light source device related to the present invention as a back light for a liquid crystal display, a thin type liquid crystal display with a high picture image quality can be obtained.

BEST MODE OF CARRYING OUT THE INVENTION

A light guide member, a planar light source device using the light guide member, and a display apparatus related to the present invention will be described below in detail with reference to the drawings. The present invention is not restricted to the following embodiments.

In the description of an embodiment of the present invention, "upward" means a direction from an illuminant (solid luminous device) toward a light guide member as a matter of convenience for an explanation.

It is effective to use a light guide member in order to sufficiently implement a uniformity in a luminance and a chromaticity and in order to prevent a thickness of a planar light source device from being increased for a so-called direct lighting type back light. Since a solid luminous device is installed upward for the direct lighting type back light, it is preferable to diffuse lights and uniformly propagate lights in the light guide member.

Figure 1:
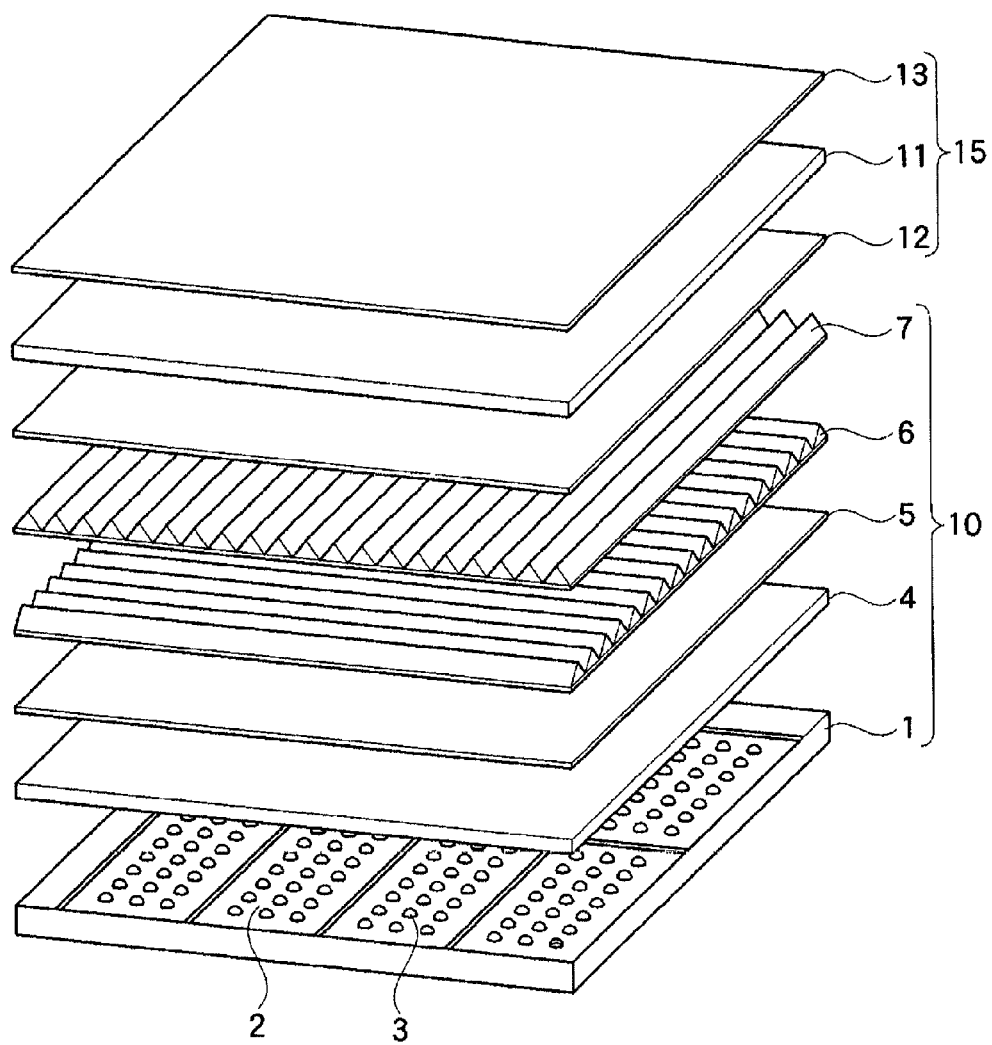
FIG. 1 is a view for showing the entire configuration of an example of a liquid crystal display apparatus to which an embodiment of the present invention is applied.

FIG. 1 is a view for showing the entire configuration of an example of a liquid crystal display apparatus to which an embodiment of the present invention is applied.

A liquid crystal display apparatus to which the present embodiment is applied is provided with a back light frame (chassis) 1 for enclosing a luminous portion and an LED substrate (mounting substrate) 2 as a substrate on which a plurality of light emitting diodes (LEDs) 3 which are solid luminous devices as an illuminant is arranged for the direct lighting type planar light source device (back light) 10.

The back light apparatus 10 is provided with a light guide member (plate or sheet) 4 on the LED substrate (mounting substrate) 2. The light guide member, which is characterized by the present invention, is enclosed in the back light frame (chassis) 1.

Figure 15:
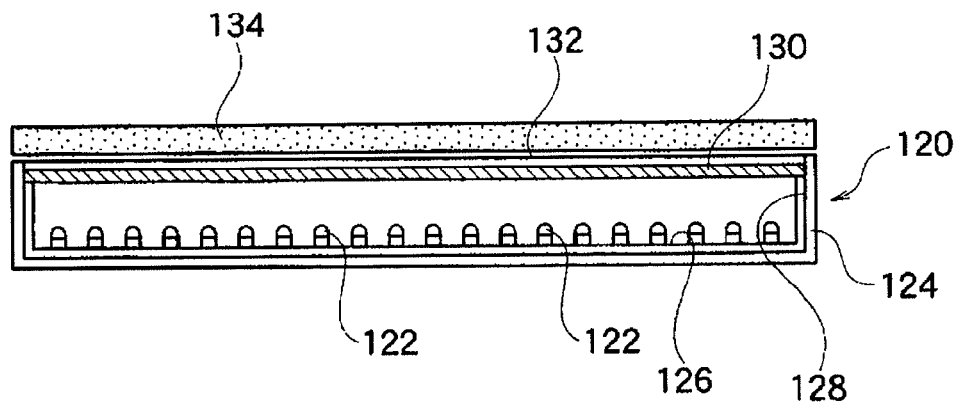
FIG. 15 is a cross sectional view showing a conventional planar light source device using LED lamps.

A difference from a conventional direct lighting type back light apparatus shown in FIG. 15 is that the light guide member is disposed in a space between a light emitting diode and a diffusing member (plate). In addition, a thickness of the back light is not increased and a space between a light emitting diode and a diffusing member (plate) can be decreased. A diffusing member (plate or diffusing film) 5 for scattering and diffusing lights to implement a uniform luminance on the entire face and prism sheets 6 and 7 that are diffraction grating films having a forward condensing effect are disposed as laminates of an optical compensating sheet on the light guide member.

Moreover, a liquid crystal display module 15 is provided with a liquid crystal panel 11 in which a liquid crystal is interposed by two glass substrates and polarizing plates (polarizing filters) 12 and 13 laminated on the glass substrates of the liquid crystal panel 11 for restricting a light wave vibration to a certain direction. Furthermore, the liquid crystal display apparatus is provided with peripheral members such as a driving LSI although this is not shown in the figure.

The liquid crystal panel 11 contains many kinds of components although these are not shown in the figure. For instance, the liquid crystal panel is provided with two glass substrates, a display electrode, an active device such as a thin film transistor, a liquid crystal, a spacer, a sealing agent, an orientation film, a common electrode, a protection film, and a color filter although these are not shown in the figure.

Figure 2:
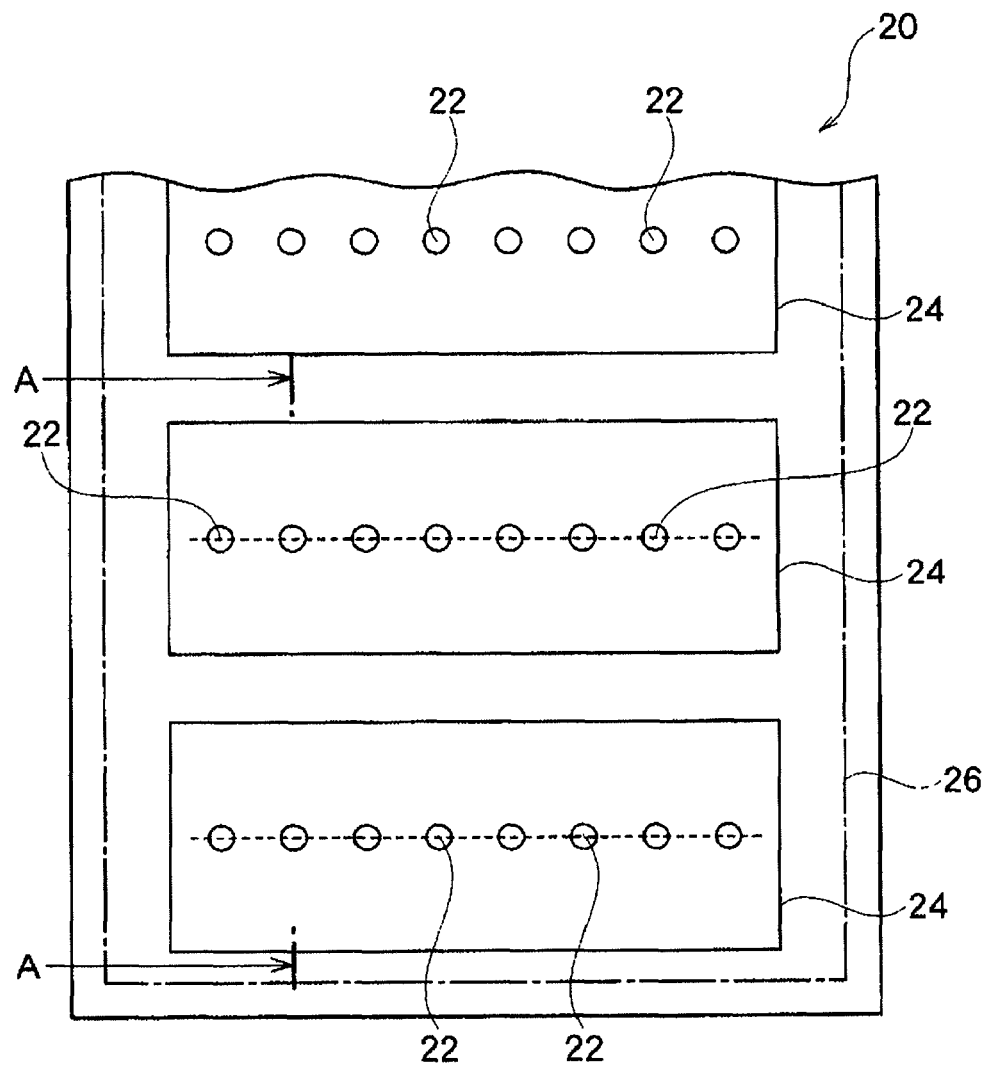
FIG. 2 is a plan view showing a part of a planar light source device adopting a light guide member related to a first embodiment of the present invention.
Figure 3:
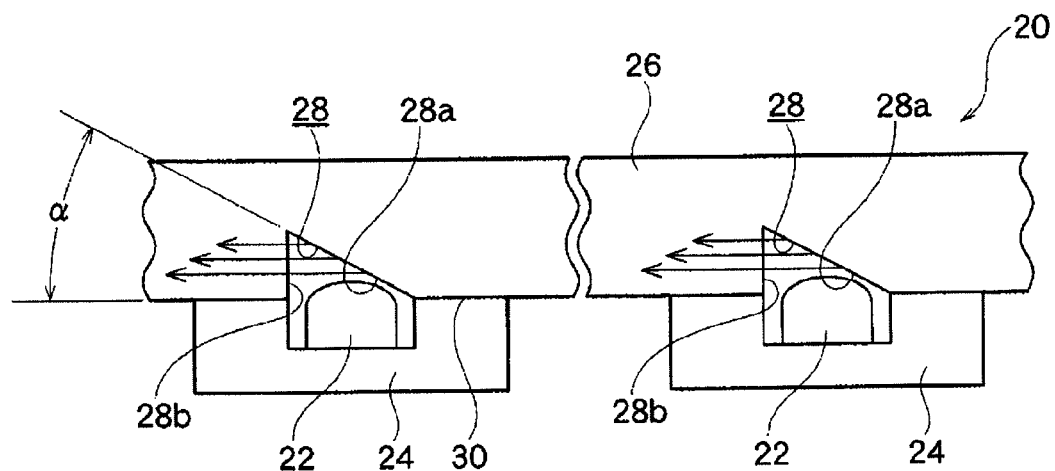
FIG. 3 is a partially enlarged schematic cross sectional view along the A-A line of FIG. 2.

FIG. 2 is a schematic view showing a light guide member and a planar light source device adopting the light guide member related to a first embodiment of the present invention, and FIG. 3 is a partially enlarged schematic cross sectional view along the A-A line of FIG. 2.

A planar light source device 20 is suitably used as a back light for a large size liquid crystal display in an almost rectangular shape for instance.

In the present description, as a matter of convenience for an explanation, one major face of the light guide member 26 means the bottom face of the light guide member 26, and the other major face of the light guide member 26 means the upper face of the light guide member 26.

As shown in FIG. 2, a planar light source device 20 is provided with a plurality of light emitting diodes (LEDs) 22 which are illuminants, a substrate 24 on which the light emitting diodes 22 are disposed at a specified pitch, and a light guide member 26 disposed in such a manner that the light guide member 26 can cover the entire area over a plurality of substrates 24. Moreover, as shown in FIG. 3, a depression is formed on the upper face of the substrate 24, and the light emitting diodes 22 are disposed in the depression.

While a color of the light emitting diode 22 can be white, a monochromatic light emitting diode is used in the present embodiment.

As shown in FIG. 2, the substrate 24 is formed as a unit in such a manner that a width in an arrangement direction of the light emitting diodes 22 is longer. As such a substrate 24, there can be illustrated a metal with an excellent thermal conductivity (for instance, aluminum or copper), or a printed wiring board based on aluminum nitride or the like.

On the other hand, while the light guide member 26 is preferably a plate or a sheet made of a transparent plastic material such as an acrylic resin and polycarbonate, and is configured by one plate that covers the entire of a plurality of substrates 24, the light guide member 26 can be a unit with a size equivalent to that of the substrate 24. In such a case, a plurality of light guide members is disposed to be used. In the case in which light guide members are formed as units, a yield of molding products is satisfactory. In addition, even in the case in which a failure occurs, only the failure part can be exchanged. A preferable thickness of the light guide member is in the range of 2 to 10 mm, more preferably in the range of 3 to 5 mm.

A cut portion 28 in a groove shape is formed at the section facing the light emitting diodes 22 on one major face in the light guide member 26 related to the present embodiment. The cross section of the cut portion 28 is almost triangular. As shown in FIG. 3, an inclined face 28a provided with a specified inclination angle □ is formed only in one direction in the cut portion 28. As shown in FIG. 2, the cut portion 28 is formed continuously in an arrangement direction of the light emitting diodes 22. Moreover, the other face 28b of the cut portion 28 is a vertical face.

A reflecting portion for reflecting an irradiated light is formed on the inclined face 28a of the cut portion 28 formed as described above. While the reflecting portion can be formed by depositing aluminum or the like, the reflecting portion can also be formed by other means such as electrolytic plating and white ink coating.

The cut portion 28 of the light guide member 26 is disposed in such a manner that the cut portion 28 faces the light emitting diode 22. While there can be a space in the cut portion 28, the cut portion 28 can also be sealed with a resin.

For the planar light source device 20 related to the present embodiment, a reflecting portion 30 is disposed on the junction face between the substrate 24 and the light guide member 26. The reflecting portion 30 is disposed or formed by coating or the like, thereby improving a uniformity in a luminance distribution at an emitting plane of the light guide member 26.

For the planar light source device 20 with the above configuration, since the inclined face 28a is formed at the position directly over the light emitting diode 22, in which a luminance of the light guide member 26 becomes highest, a light irradiated to the face can be guided in a horizontal direction as shown by the arrows. Consequently, an unevenness of luminance of the light guide member 26 can be effectively reduced.

While the planar light source device 20 related to the present embodiment is formed as described above, the operation will be described below.

For instance, such a planar light source device 20 is used as a back light for a liquid crystal display.

In the case in which a voltage is applied to the light emitting diode 22, a light that has been emitted from the light emitting diode 22 enters the cut portion 28. The light irradiated to the inclined face 28a in the cut portion 28 is reflected in a horizontal direction as shown by the arrows in FIG. 3, and is guided to the internal side of the light guide member 26. Accordingly, the irradiated light that tries to travel upward from the light emitting diode 22 is dispersed in a horizontal direction. As a result, a luminance of the section directly over the light emitting diode 22 can be reduced. The inclination angle α of the inclined face 28a to the reflecting portion 30, which can be properly selected, is preferably in the range of 20 to 45 degrees.

As described above, since a light can be guided in a horizontal direction directly over the all light emitting diodes 22, almost uniform lights can be irradiated as a back light for a liquid crystal display.

While the cross section of the cut portion 28 formed in the light guide member 26 is almost triangular, in which an inclined face 28a is formed only in one direction in the above embodiment, the inclined face 28a is not restricted to one direction.

Figure 4:
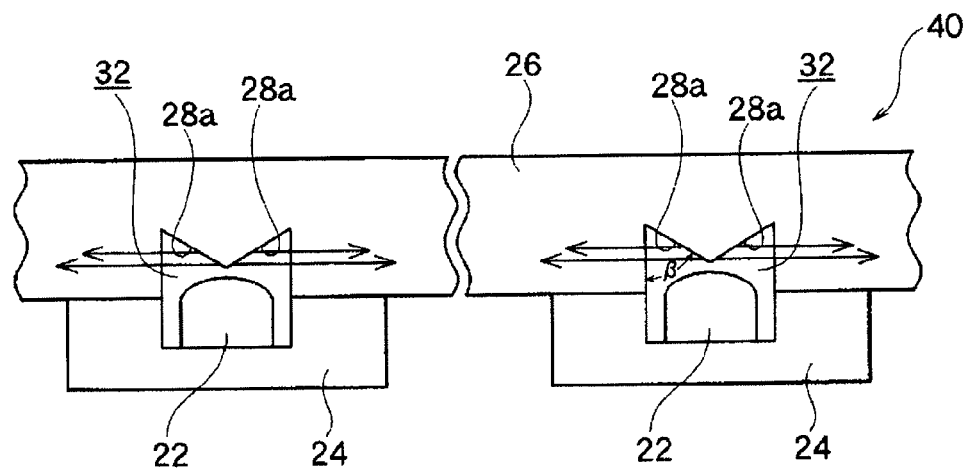
FIG. 4 is a schematic cross sectional showing a planar light source device adopting a light guide member related to a modification example of the first embodiment.

FIG. 4 shows an example in which the specified inclined faces 28a are formed in two directions as a modification example of the first embodiment.

In this embodiment, a cut portion 32 with a cross section almost M shaped is formed in the light guide member 26 in the two directions symmetrically from the center of the light emitting diode. Similarly to the previously described embodiment, the cut portion 32 is also formed in a groove shape along a plurality of light emitting diodes 22 disposed in lines.

In addition, the inclined faces 28a are reflecting portions similarly to the previously described embodiment. Even in the case of a planar light source device 40 adopting such a light guide member 26, a light that has been emitted from the light emitting diode 22 can be reflected at the reflecting portions to the both sides and can be guided in a horizontal direction. Therefore, the irradiated lights can be dispersed, and a luminance of the section directly over the light emitting diode can be reduced. In the case in which the inclined faces 28a with a cross section almost M shaped are formed, the inclination angle β is preferably in the range of 30 to 60 degrees.

Figure 5:
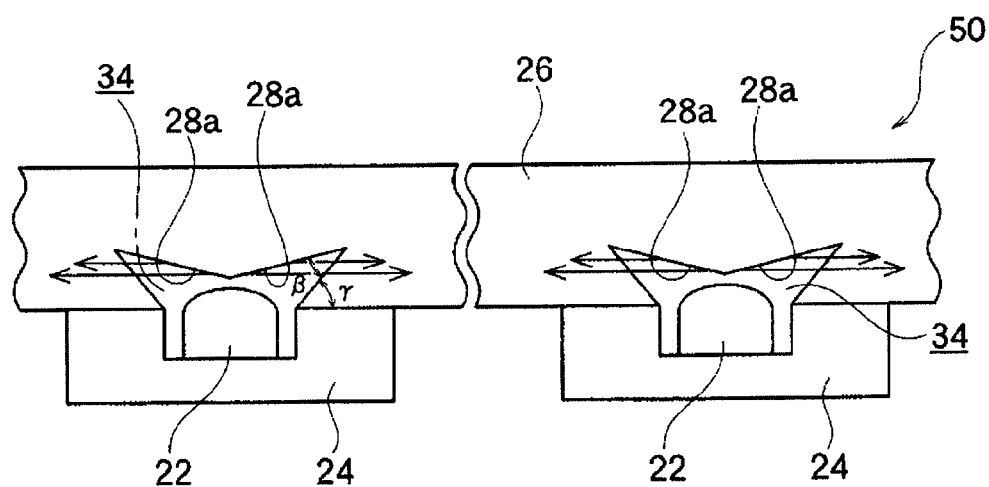
FIG. 5 is a schematic cross sectional view showing a planar light source device adopting a light guide member related to another modification example of the first embodiment.

Moreover, as another modification example shown in FIG. 5, a cut portion 34 can also be further enlarged and opened to the both sides in such a manner that the cut portion 34 is formed to have a cross section almost star shaped. In this case, an inclination angle β is preferably in the range of 25 to 35 degrees, and an angle γ on the irradiated side is preferably in the range of 70 to 75 degrees.

As described above, according to the light guide members 26 of many kinds and the planar light source devices 20, 40, and 50 using the light guide members 26 related to the present invention, a luminance of the section directly over the light emitting diode 22 can be reduced, and irradiated lights can be dispersed in a horizontal direction, thereby improving a uniformity in a luminance on the entire face.

While one plate that is long in both longitudinal and transverse directions as a light guide member 26 has been described in the above embodiments, a light guide member related to the present invention can also have a size corresponding to that of the substrate 24.

Moreover, while the cut portions 28, 32, and 34 are formed in such a manner that one of the cut portions covers some of a plurality of light emitting diodes or in a continuous groove shape in such a manner that the cut portions 28, 32, and 34 can cover the entire area over a plurality of light emitting diodes 22 in the above embodiments, a plurality of cut portions can also be formed in a scattered condition in such a manner that each cut portion corresponds to each light emitting diode 22 by one to one instead. In short, any configuration in which lights irradiated upward from the light emitting diodes 22 are dispersed in a horizontal direction can be adopted.

Furthermore, while a width of the cut portions 28, 32, and 34 formed in the light guide member 26 is equivalent to that of the depression formed in the substrate 44 that corresponds to the cut portions 28, 32, and 34 in the above embodiments, it is not necessary to make the widths equivalent in particular.

Moreover, while a depression is formed on the upper face of the substrate 24 and the light emitting diode 22 is disposed in the depression in the above embodiments, the present invention is not restricted to the above embodiments, and the light emitting diode 22 can also be disposed on a surface of a flat substrate 24.

Furthermore, while monochromatic light emitting diodes 22 are used in the above embodiments, for instance, three light emitting diodes of R (red), G (green), and B (blue) can also be put together as one lamp.

Moreover, while light emitting diodes 22 are disposed on a straight line in the above embodiments, it is not necessary to dispose the light emitting diodes on a straight line. The light emitting diodes can also be disposed in a staggered pattern or at positions slightly shifted from the straight line.

Figure 6:
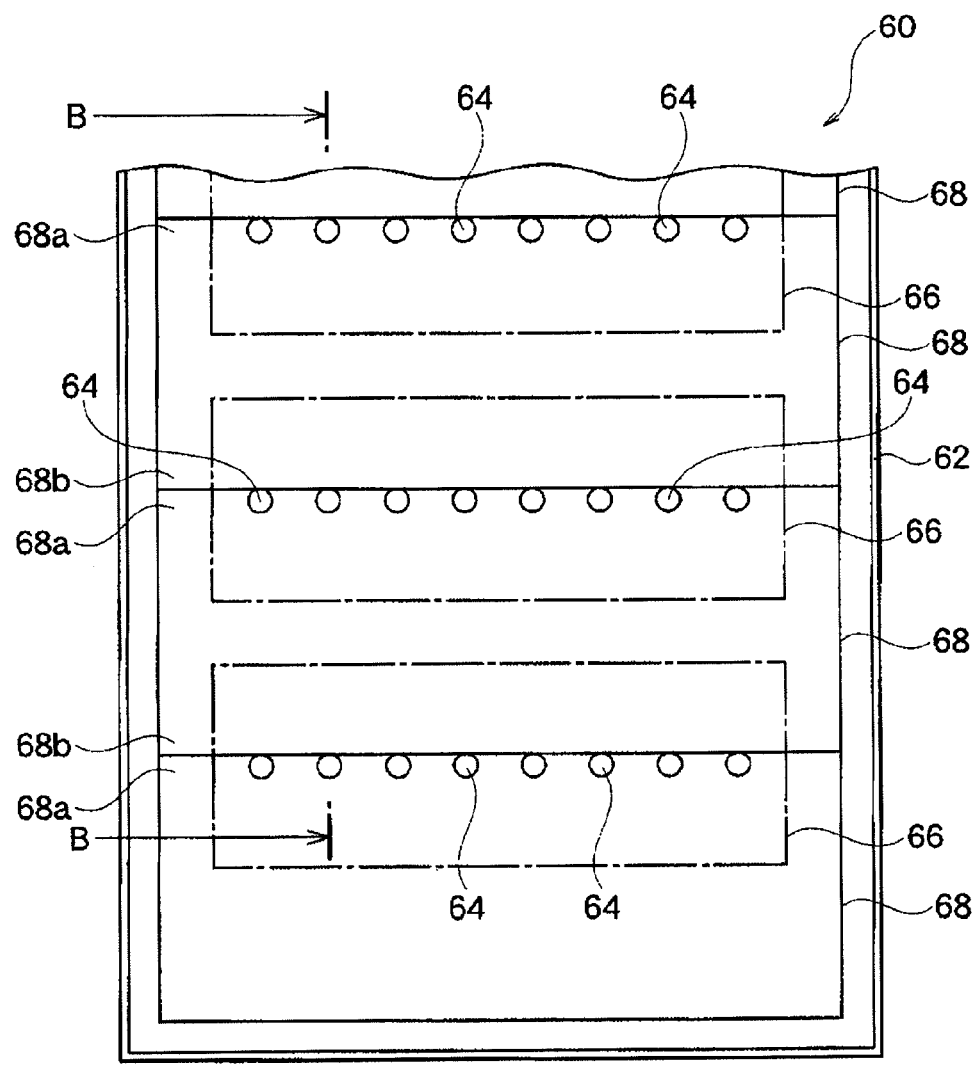
FIG. 6 is a plan view showing a part of a planar light source device adopting a light guide member related to a second embodiment of the present invention.
Figure 8:
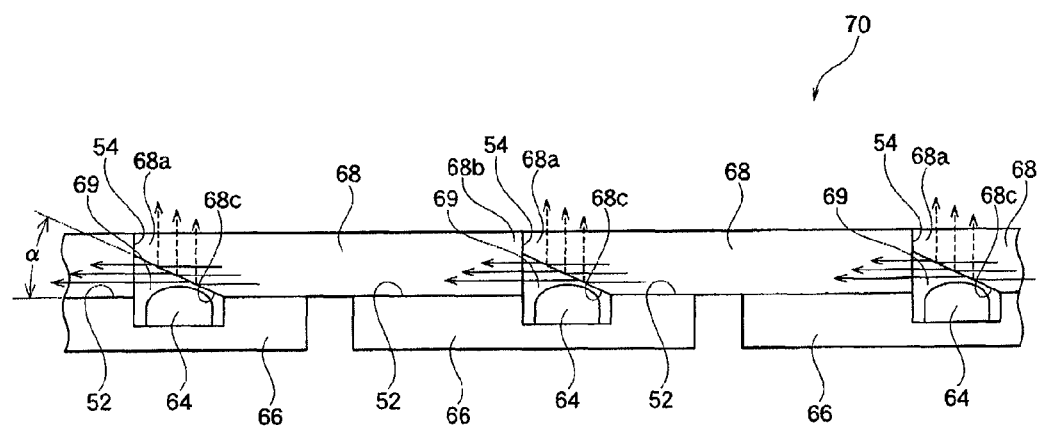
FIG. 8 is a partially enlarged schematic cross sectional view along the B-B line of FIG. 6.

FIG. 6 is a schematic plan view showing a light guide member and a planar light source device adopting the light guide member related to a second embodiment of the present invention, and FIG. 8 is a partially enlarged schematic cross sectional view along the B-B line of FIG. 6.

A planar light source device 60 provided with the light guide member is suitably used as a back light for a large size liquid crystal display in an almost rectangular shape for instance.

The planar light source device 60 is provided with a chassis 62 in an almost rectangular shape, a plurality of substrates 66 on which the LED lamps 64 in which a plurality of LED devices with different luminance colors (a red LED, a green LED, and a blue LED) are put together as one lamp that is an illuminant are disposed at a specified pitch, and a plurality of divided members 68 of a light guide member (plate) disposed in such a manner that the light guide member covers the area over the substrates 66.

While a plurality of LED lamps 64 is disposed linearly in lines on the substrate 66, at least two lines of LED lamps can also be disposed as a matter of course. Moreover, a large substrate can also be prepared in place of a plurality of substrates 66, and many LED lamps can be disposed on the large substrate.

As the substrate 66, there can be illustrated a metal with an excellent thermal conductivity (for instance, aluminum or copper), or a printed wiring board based on aluminum nitride or the like.

Figure 7:
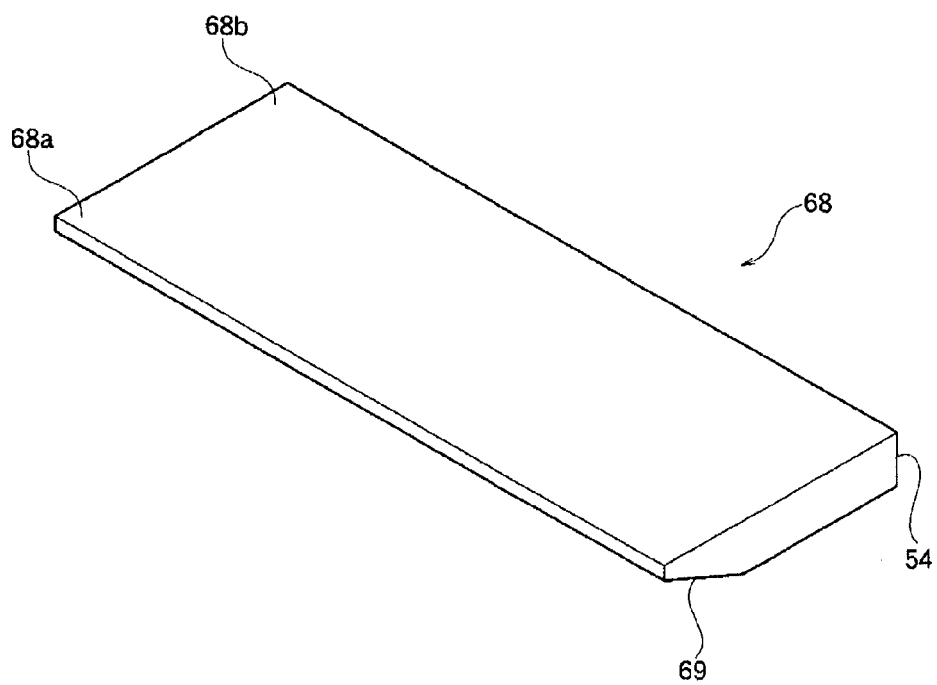
FIG. 7 is a schematic perspective view showing a divided member configuring the light guide member shown in FIG. 6.

On the other hand, as shown in FIG. 7, a plurality of divided members 68 that configure the light guide member in a sheet shape is in an almost rectangular shape and is provided with a cut portion 69 with an almost triangular cross section on one edge portion 68a. As shown in FIG. 8, the divided members 68 face to each other, thereby configuring the light guide member 70 spreading in a sheet shape.

For the planar light source device 60 related to the present embodiment, as shown in FIGS. 6 and 8, one of a plurality of divided members 68 that configure the light guide member is disposed on parts of two contiguous substrates 66. Moreover, the LED lamp 64 is disposed in such a manner that the LED lamp faces one edge portion 68a of the divided member 68.

The cut portion 69 of the divided member 68 is formed, for instance, by cutting diagonally one edge portion 68a of the divided member 68 from a position between the top and bottom in a direction of a thickness. More specifically, the cut portion is formed in such a manner that the cut portion is connected to a second small end face that faces and is opposite to a first small end face, which will be described later. As shown in FIG. 8, an inclined face 68c provided with a specified inclination angle α is formed in the cut portion 69.

The inclined face 68c of the divided member 68 is a reflecting portion for reflecting a light irradiated from the LED lamp 64 for instance. While the reflecting portion can be formed by depositing aluminum or the like, the reflecting portion can also be formed by other means such as plating and white ink coating.

In addition, the rear face side of the inclined face 68c is also a reflecting portion. More specifically, since the rear face side of the inclined face 68c is a reflecting portion, a light guided in a horizontal direction inside the divided member 68 can be reflected upward as shown by the arrows of the dashed lines in FIG. 8.

While there can be a space in the cut portion 69, the cut portion 69 can also be sealed with a resin.

Moreover, for the light guide member 70 composed of a plurality of divided members 68, a reflecting portion 52 is disposed on the bottom face of the divided member 68 or on the upper face of the substrate 66. The reflecting portion 52 is disposed or formed by coating or the like, thereby improving a luminance and a uniformity in a luminance on an emitting plane of the divided member 68.

For the planar light source device 60 with the above configuration, since the inclined face 68c is formed at the position directly over the LED lamp 64, in which a luminance of the divided member 68 becomes highest, a light irradiated to the face can be guided in a horizontal direction as shown by the arrows in FIG. 8. Consequently, an unevenness of luminance of the light guide member can be effectively reduced.

Moreover, in this embodiment, a light diffusion portion 54 of a white color for instance is formed on a small end face (equivalent to a first small end face) on the other edge portion 68b side of the divided member 68 on the opposite side, which faces one edge portion in which the cut portion 69 of the divided member 68 is formed.

The light diffusion portion 54 can be made of a white film or can be formed by coating a white resin. In the case in which the light diffusion portion 54 is formed on the first small end face of the divided member 68 as described above, while an amount of lights that pass through the first small end face is reduced somewhat (part of lights passes through), coloring in white can be accelerated even in the case in which a color mixture of lights that pass through is insufficient.

A similar effect can be obtained by roughing the edge face by carrying out a blast processing or the like instead of forming the white light diffusion portion.

While the light guide member 70 and the planar light source device 60 using the light guide member 70 related to the present embodiment are formed as described above, the operation will be described below.

For instance, such a planar light source device 60 is used as a back light for a liquid crystal display.

In the case in which a voltage is applied to the LED lamp 64, a light that has been emitted from the LED lamp 64 enters the cut portion 69 as shown in FIG. 8. The light irradiated to the inclined face 68c in the cut portion 69 is reflected in a horizontal direction as shown by the arrows of the solid lines in FIG. 8, and is guided to the internal side of the divided member 68. Accordingly, the irradiated light that tries to travel upward from the LED lamp 64 is dispersed in a horizontal direction. As a result, a luminance of the section directly over the LED lamp 64 can be reduced.

A light that has been guided in a horizontal direction inside the divided member 68 from the LED lamp 64 contiguous to the right side of the divided member 68 in the drawing (in a direction from the other edge portion 68b of the divided member 68 toward one edge portion 68a) is guided to the rear face side of the inclined face 68c in the divided member 68. The light is then guided upward by the reflecting face on the rear face side as shown by the arrows of the dashed lines. Therefore, a luminance of the section directly over the LED lamp 64 is not extremely reduced.

Here, the inclination angle α of the inclined face 68c, which can be properly selected, is preferably in the range of 20 to 45 degrees.

As described above, since a light irradiated from the LED lamp 64 can be guided in a horizontal direction directly over the all LED lamps 64, almost uniform lights can be irradiated as a back light for a liquid crystal display.

In addition, since the light diffusion portion 54 is formed on a facing plane of the divided members 68, coloring in white can be improved by passing through the light diffusion portion 54 even in the case in which a color mixture of lights that try to pass through the facing plane is insufficient.

According to the light guide member 70 and the planar light source device 60 using the light guide member 70 related to the present invention, a luminance of the section directly over the LED lamp 64 can be reduced, and irradiated lights can be dispersed in a horizontal direction, thereby improving a luminance and a uniformity in a luminance on the entire face. Moreover, since the light diffusion portion 54 is formed on the other edge portion 68b of the divided member 68, coloring in white can be carried out even in the case in which a color mixture of lights that try to pass through the other edge portion is not carried out sufficiently.

While the substrates 66 are configured by divided portions in the above embodiment, the substrates can also be one continuous substrate.

Moreover, while a depression is formed on the upper face of each substrate 66 and the LED lamp 64 is disposed in the depression in the above embodiment, the present invention is not restricted to the above embodiment, and the LED lamp 64 can also be disposed on a surface of a flat substrate 66.

Furthermore, while the above embodiment illustrates the case in which the LED lamp 64 in which LED devices with different luminance colors are put together as one lamp is used, the LED lamp 64 can also be monochromatic. In the case in which LED devices with different luminance colors are used, the LED devices are not restricted to the case of three colors of red, green, and blue.

Moreover, while LED lamps 64 are disposed on a straight line in the above embodiment, it is not necessary to dispose the LED lamps 64 on a straight line. The LED lamps 64 can also be disposed in a staggered pattern or at positions slightly shifted from the straight line.

Figure 9:
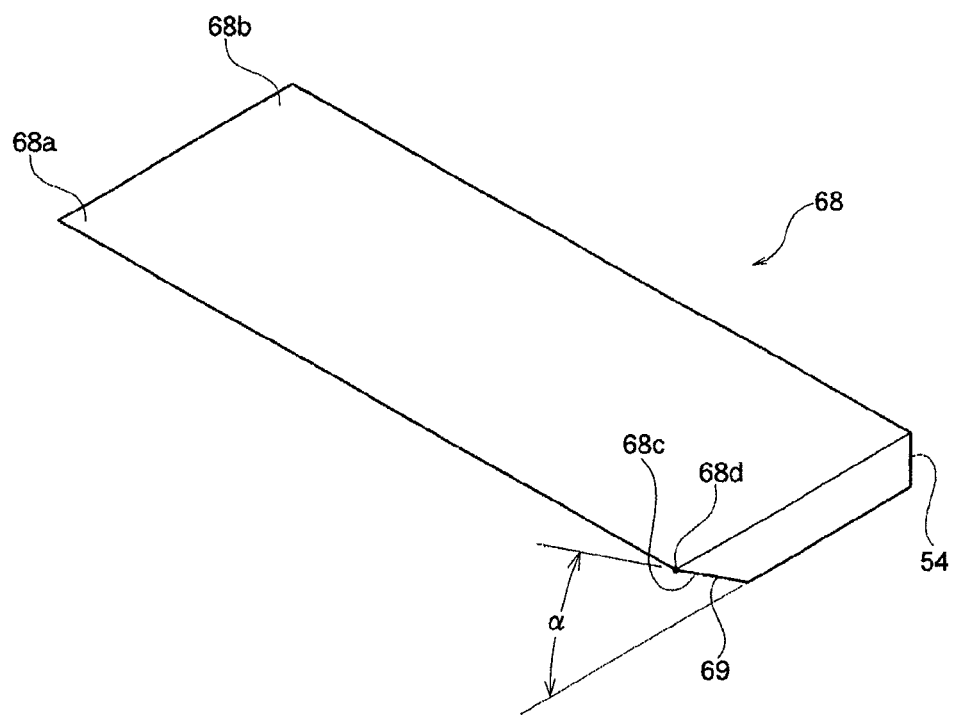
FIG. 9 is a schematic perspective view showing a divided member configuring the light guide member related to a modification example of the second embodiment.

Furthermore, while the inclined face 68c of the divided member 68 is formed diagonally from a position between the top and bottom in a direction of a thickness of the divided member 68 in the above embodiment, the inclined face 68c can also be formed continuously from a vertex 68d in a direction of a thickness as shown by a modification example in FIG. 9 in the case in which the inclination angle α is in the range of 20 to 45 degrees.

Moreover, while the cut portion 69 with an almost triangular cross section is formed in one edge portion 68a of the divided member 68 in the above embodiment, the cut portion 69 can also be formed between one edge portion 68a and the other edge portion 68b of the divided member 68 and the divided member 68 can be disposed in such a manner that the cut portion 69 is located directly over the illuminant, as the modification example.

Figure 10:
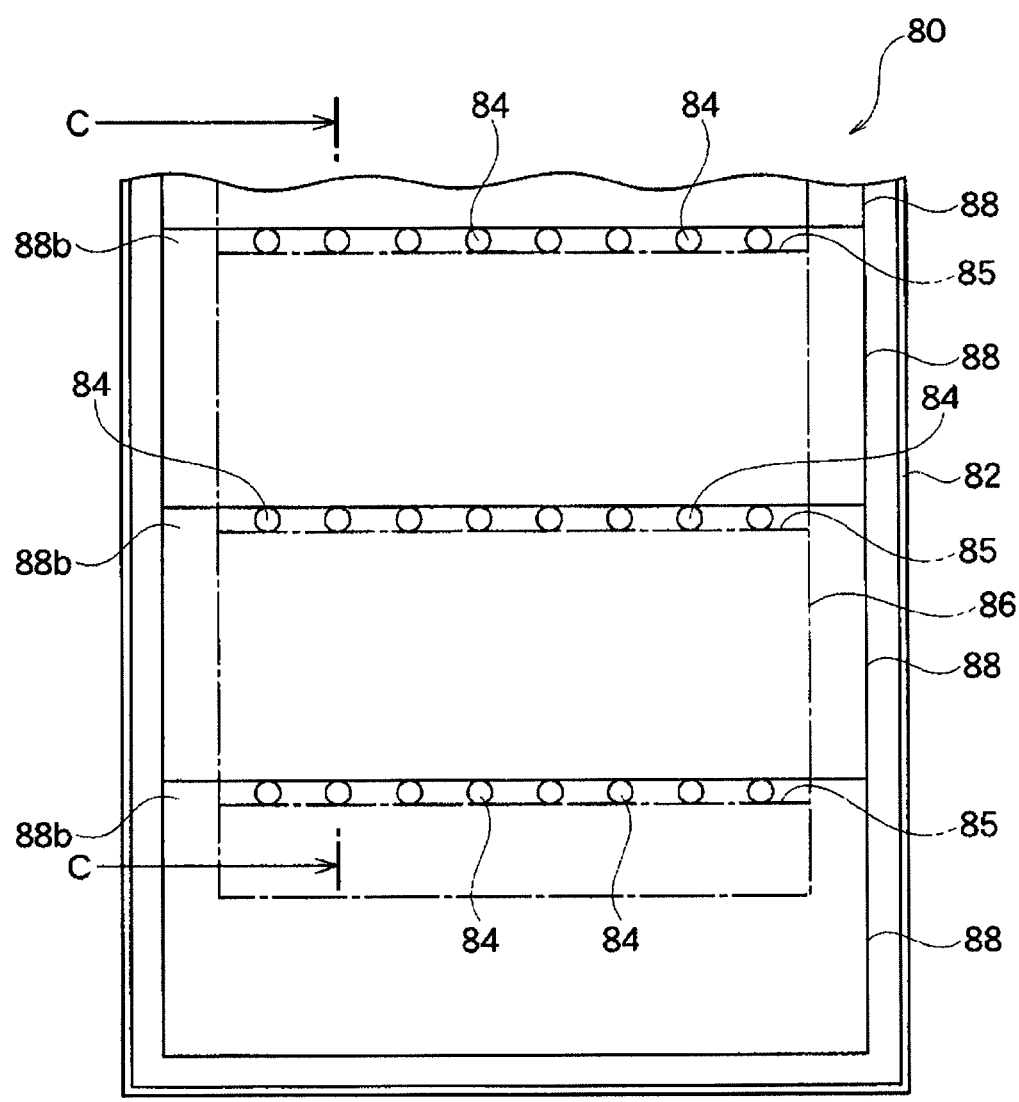
FIG. 10 is a plan view showing a part of a planar light source device adopting a light guide member related to a third embodiment of the present invention.
Figure 11:
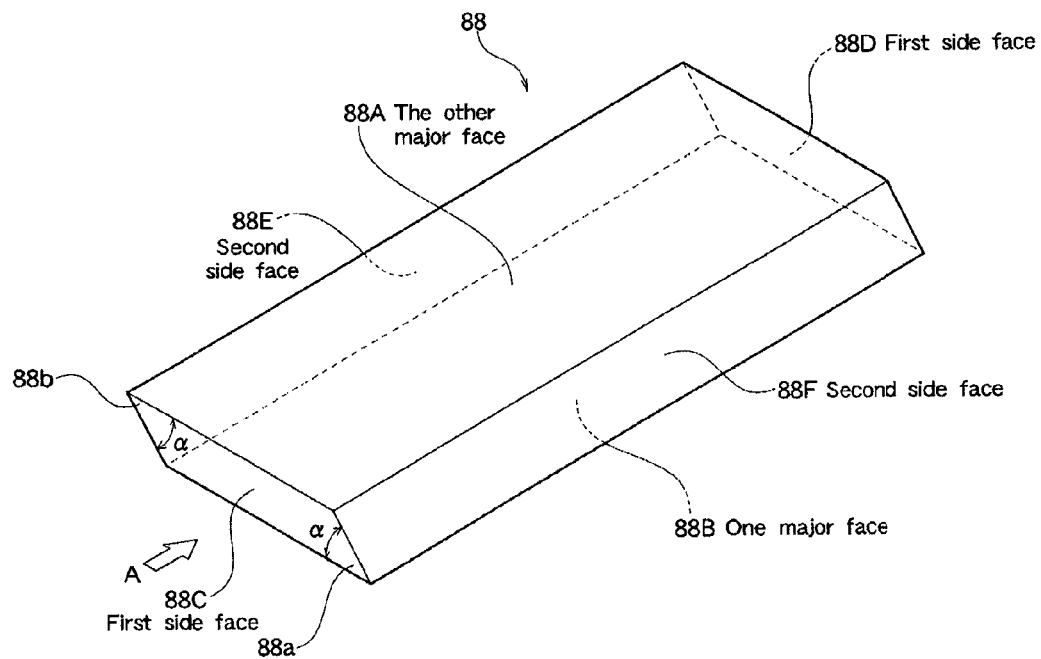
FIG. 11 is a schematic perspective view showing a divided member configuring the light guide member shown in FIG. 10.
Figure 12:
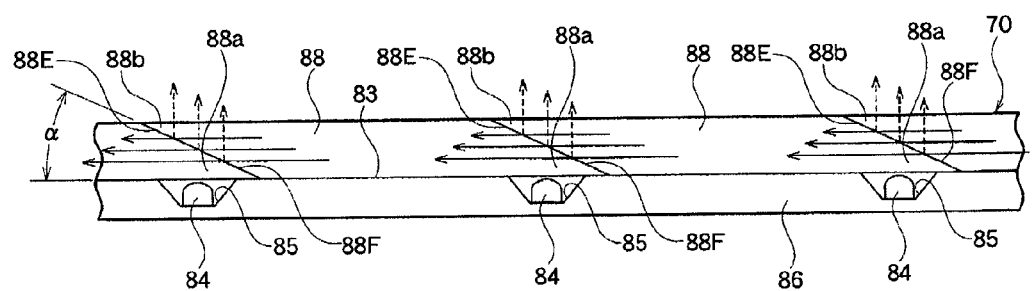
FIG. 12 is a partially enlarged schematic cross sectional view along the C-C line of FIG. 10.

FIG. 10 is a schematic plan view showing a light guide member and a planar light source device adopting the light guide member related to a third embodiment of the present invention, and FIG. 12 is a partially enlarged schematic cross sectional view along the C-C line of FIG. 10. In the description of the present embodiment, "upward", "downward", "left", and "right" are used as a matter of convenience for an explanation. For instance, a direction of a divided member 88 viewed from an LED lamp 84 is "upward" in FIG. 12. In addition, a direction of one edge portion 88a is "right", and a direction of the other edge portion 88b is "left" in FIG. 11.

A planar light source device 80 provided with the light guide member is suitably used as a back light for a large size liquid crystal display in an almost rectangular shape for instance.

As shown in FIG. 10, the planar light source device 80 is provided with a chassis 82 in an almost rectangular shape, LED lamps 84 in which a plurality of LED devices with different luminance colors (a red LED, a green LED, and a blue LED) are put together as one lamp that is an illuminant, a substrate 86 on which the LED lamps 84 are disposed, and a plurality of divided members 88 disposed in such a manner that the divided members cover the area over the substrate 86. As shown in FIG. 11, the divided member 88 is provided with six faces composed of two faces 88A and 88B which are major faces, two faces 88C and 88D which are first side faces opposite to each other, and two faces 88E and 88F which are second side faces opposite to each other. As described above, the large light guide member (plate) 90, which spreads in a sheet shape, related to the present embodiment is configured by a plurality of divided members 88 that are hexahedrons.

As shown in FIG. 12, while grooves 85 are formed at a specified pitch on the substrate 86 and a plurality of LED lamps 84 is disposed linearly in lines in the grooves 85, at least two lines of LED lamps can also be disposed in a groove 85 as a matter of course. Moreover, a plurality of substrates divided to small members can also be disposed at the specified positions in place of the large substrate 86.

Here, while the groove 85 can be formed by directly processing a surface of the substrate 86, the groove 85 can also be formed by bonding a frame provided with an opening portion to a surface of the substrate. In particular, it is preferable to bond a frame made of a metal such as aluminum and chrome, a white resin, or a resin painted in white that can effectively reflect a light, to a surface of the substrate.

As the substrate 86, there can be illustrated a metal with an excellent thermal conductivity (for instance, aluminum or copper) or a printed wiring board.

On the other hand, as shown in FIG. 11, a plurality of divided members 88 that configure the light guide member in a sheet shape has a parallelogram shape in the case in which the side (first side face 88C) of the divided member is viewed in a direction of the arrow A, and is formed in a plate shape as a whole. Since the divided members 88 shown in FIG. 11 face to each other at second side faces (88E and 88F) as shown in FIG. 12, the large light guide member 90 which spreads in a sheet shape is configured. As described above, in the case in which the divided members face to each other in a face direction, the other edge portion 88b of another contiguous divided member 88 is superposed on one edge portion 88a without a gap.

Here, the second side faces 88E and 88F have a rectangular shape.

As described above, for the planar light source device 80 related to the present embodiment, as shown in FIGS. 10 and 12, a plurality of divided members 88 that configure the light guide member is disposed in order on the large substrate 86 which spreads in a sheet shape. Moreover, the LED lamp 84 is disposed in such a manner that the LED lamp faces and opposite to an inclined face (the second side face 88F) of one edge portion 88a of the divided member 88. In other words, the LED lamp 84 is disposed under the divided member of the range included in a projection region of the inclined face (the second side face 88F).

As shown in FIGS. 11 and 12, an inclination angle of one edge portion 88a and the other edge portion 88b of the divided member 88 is a.

Here, the inclined face (88F) of one edge portion 88a of the divided member 88 is provided with a reflecting portion for reflecting a light irradiated from the LED lamp 84 for instance. While the reflecting portion can be formed by depositing aluminum or the like, an aluminum tape or the like can also be bonded instead of a deposition. In addition, the reflecting portion can also be formed by other means such as plating or white ink coating. Moreover, the back face side (the second side face 88E) of the other edge portion 88b is also made to be a reflecting portion by means such as bonding an aluminum tape. More specifically, since the second side face 88F is a reflecting portion, a light guided in a horizontal direction inside the divided member 88 (a light guided from right to left in FIG. 12) can be reflected upward as shown by the arrows of the dashed lines in FIG. 12. An amount of transmitted lights at the section directly over an illuminant is preferably zero.

Furthermore, while the reflecting portion of a light is formed on both the second side faces 88E and 88F corresponding to each other in the present embodiment, at least one of the second side faces 88E and 88F is preferably a reflecting portion of a light.

As shown in FIG. 12, there can be a space in the groove 85 in the present embodiment.

Moreover, for such a light guide member 90, a reflecting portion 83 is disposed on at least one of the bottom face of the divided member 88 (one major face 88B) other than the section directly over an LED lamp and the upper face of the substrate 86. Such a reflecting portion 83 is disposed or formed by coating or the like, thereby improving a uniformity in a luminance at an emitting plane of the divided member 88.

For the planar light source device 80 with the above configuration, since the inclined face (the second side face 88F) is formed at the position directly over the LED lamp 84, in which a luminance of the divided member 88 becomes highest, a light irradiated to the face can be guided in a horizontal direction as shown by the arrows in FIG. 12. Consequently, an increase in a luminance at the position directly over the LED lamp can be suppressed, and an unevenness of luminance of the light guide member can be effectively reduced.

While the light guide member 90 and the planar light source device 80 using the light guide member 90 related to the present embodiment are formed as described above, the operation will be described below.

In the case in which a voltage is applied to the LED lamp 84, a light that has been emitted from the LED lamp 84 directly travels upward or is reflected by the inside wall of the groove 85 and travels upward. The light irradiated to the inclined face (the second side face 88F) of one edge portion 88a is reflected in a horizontal direction (in a left direction) as shown by the arrows of the solid lines in FIG. 12, and is guided to the internal side of the divided member 88. Accordingly, the irradiated light that tries to travel upward from the LED lamp 84 is dispersed in a horizontal direction. As a result, a luminance of the section directly over the LED lamp 84 can be reduced.

A light that has been guided in a horizontal direction inside the divided member 88 (in a direction from one edge portion 88a of the divided member 88 toward the other edge portion 88b) is guided to the inclined face (the second side face 88E) in the divided member 88 while the luminance is gradually reduced. The light is then guided upward by being reflected on the inclined face as shown by the arrows of the dashed lines. Therefore, a luminance of the section directly over the LED is not extremely reduced.

Here, the inclination angle α of the second side faces 88E and 88F, which can be properly selected, is preferably in the range of 10 to 45 degrees.

As described above, since a light irradiated from the LED lamp 84 can be guided in a horizontal direction at the sections directly over the all LED lamps 84, almost uniform lights can be irradiated as a back light for a liquid crystal display. In addition, since there is no gap at the facing plane in the present embodiment, a light does not unexpectedly leak outside, thereby preventing a loss of a light.

According to the light guide member 90 and the planar light source device 80 using the light guide member 90 related to the present invention, a luminance of the section directly over the LED lamp 84 can be reduced, and irradiated lights can be dispersed in a horizontal direction, thereby improving a luminance and a uniformity in a luminance on the entire face. In addition, since there is no gap at the facing plane, a light does not unexpectedly leak outside.

While the substrate 86 is one continuous plate in the above embodiment, the substrate can also be configured by divided portions.

Moreover, while the groove 85 is formed on the upper face of each substrate 86 and the LED lamp 84 is disposed in the groove 85 in the above embodiment, the present invention is not restricted to the above embodiment, and the LED lamp 84 can also be disposed on a surface of a flat substrate 86.

Furthermore, while the above embodiment illustrates the case in which the LED lamp 84 in which LED devices with different luminance colors are put together as one lamp is used, the LED lamp 84 can also be monochromatic. In the case in which LED devices with different luminance colors are used, the LED devices are not restricted to the case of three colors of red, green, and blue.

Moreover, while LED lamps 84 are disposed on a straight line in the above embodiment, it is not necessary to dispose the LED lamps 84 on a straight line. The LED lamps 84 can also be disposed in a staggered pattern or at positions slightly shifted from the straight line.

Figure 13:
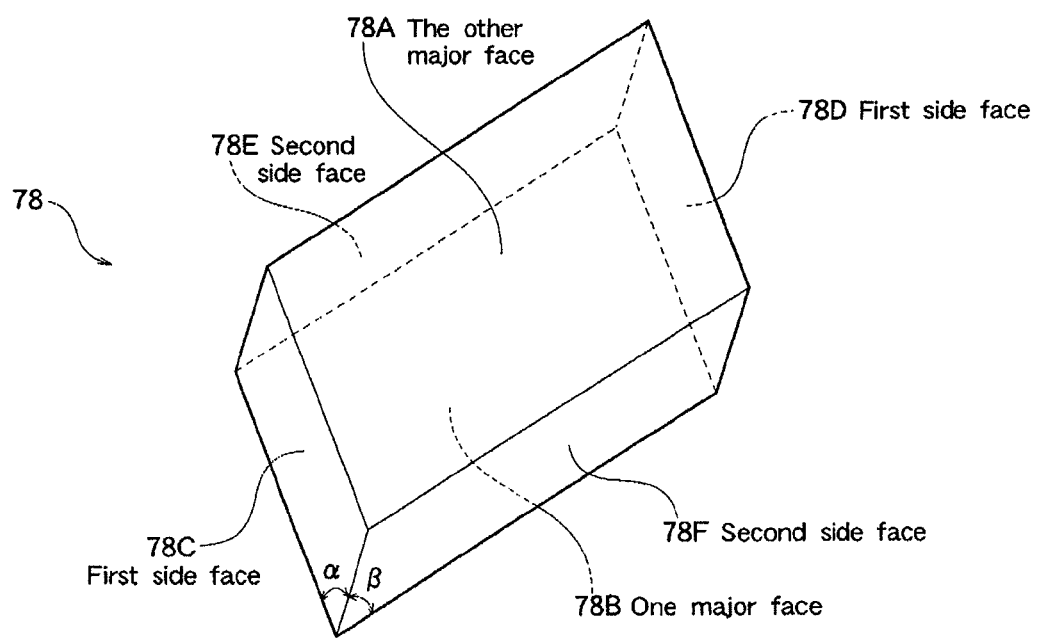
FIG. 13 is a schematic perspective view showing a divided member configuring the light guide member related to a modification example of the third embodiment.
Figure 14:
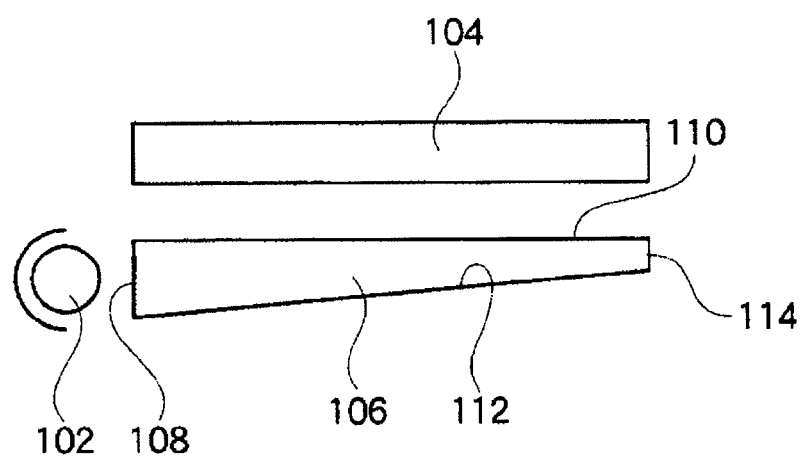
FIG. 14 is a schematic view showing a planar light source device using a conventional edge light type illuminant.

Furthermore, as shown in FIG. 11, while the divided member 88 has a parallelogram shape in the case in which the side of the divided member 88 is viewed in a direction of the arrow A in the above embodiment, the divided member can also be a divided member 78 of the modification example in which surrounding four side faces are parallelograms with an inclination angle α or β as shown in FIG. 13.

More specifically, in the divided member 78 related to the above embodiment, not only the first side faces 78C and 78D but also the second side faces 78E and 78F are formed in a parallelogram shape. In the case in which such a divided member 78 is used, the divided members 78 are preferably arranged in two directions of the X and Y directions.

A disposing position of an illuminant against the divided member 78 arranged in two directions of the X and Y directions and spreading in a plane shape is preferably under the divided member of the range included in a projection region of the first side face 78C. A disposing position of an illuminant can also be under the divided member of the range included in a projection region of the second side face 78F. Here, the inclination angles α and β are preferably in the range of 10 to 45 degrees.

Moreover, the reflecting portion of a light is formed on at least one side 78C of the first side faces or at least one side 78F of the second side faces. An illuminant is disposed under the divided member of the range included in a projection region of at least one side on which a reflecting portion is formed.

In particular, in the case in which the reflecting portion is formed on at least one side 78C of the first side faces and at least one side 78F of the second side faces and illuminants are disposed under the divided member of the range included in a projection region of the both side faces on which a reflecting portion is formed, lights from the illuminants can be preferably dispersed in both the X and Y directions.

In the present description, the word of "reflecting portion" involves both the case of the diffusion such as a case of coating a white ink and the case of a regular reflection such as a case of bonding an aluminum tape or of plating aluminum.

In the case of the present invention, the reflecting portion is more preferably for the diffusion.

The invention claimed is:

1. A light guide member disposed over an illuminant and in which a light that has entered a bottom face of the light guide member from the illuminant is emitted from the an upper face of the light guide member, comprising:
   a cut portion formed on the bottom face of the light guide member at a section of the bottom face located above the illuminant, wherein the cut portion of the bottom face has an inclined face which is disposed above the illuminant and extends toward the upper face of the light guide member, and
   a reflecting portion comprised of the inclined face of the cut portion of the bottom face, and which reflects the light emitted from the illuminant.

2. A light guide member as defined in claim 1, wherein the illuminant is a light emitting diode.

3. A light guide member as defined in claim 1, wherein the illuminant comprises a plurality of light elements and the inclined face of the cut portion is formed on the bottom face of the light guide member in such a manner that the cut portion covers at least one of the plurality of the light elements.

4. A light guide member as defined in claim 3, wherein the cut portion has a triangular cross section, in which the inclined face is formed only in one direction.

5. A light guide member as defined in claim 3, wherein the cut portion has a M-shaped cross section, in which inclined faces, including the inclined face, are conjoined at one end and extend in two directions toward the upper surface of the light guide member.

6. A light guide member as defined in claim 3, wherein the cut portion extends in a length direction of the light guide member and is disposed over the plurality of light elements which are linearly arranged under the light guide member in the length direction.

7. A light guide member as defined in claim 1, wherein the illuminant comprises a plurality of light elements and the inclined face of the cut portion is formed on the bottom face of the light guide member in such a manner that a plurality of the cut portions, including the cut portion, are formed in a scattered arrangement at a specified pitch on the bottom face of the light guide member, and individual ones of the plurality of cut portions face individual ones of the plurality of light elements.

8. A planar light source device, comprising:
   the light guide member as defined in claim 1;
   the illuminant; and
   a substrate on which the illuminant is disposed.

9. A display apparatus, comprising:
   the planar light source device as defined in claim 8 as a back light; and
   a display portion which receives light from the back light.

10. A display apparatus as defined in claim 9, wherein the display portion is a liquid crystal panel.

11. A light guide member as defined in claim 1, further comprising:
   a plurality of divided members adjacently disposed in such a manner that contiguous side faces face each other for forming the light guide member having a plate shape,
   a plurality of cut portions, including the cut portion, where individual ones of the plurality of divided members comprise individual ones of the plurality of cut portions;
   a plurality of reflecting portions, including the reflecting portion, where individual ones of the plurality of reflecting portions are disposed on the inclined face of individual ones of the plurality of cut portions; and
   a light diffusion portion disposed on a first end face of individual ones of the plurality of divided members, the first end face being a contiguous side face of the contiguous side faces.

12. A light guide member as defined in claim 11, wherein the cut portion of individual ones of the plurality of divided members is formed at an edge portion facing the first end face in the divided member.

13. A light guide member as defined in claim 11, wherein the illuminant is a light emitting diode.

14. A light guide member as defined in claim 11, wherein the illuminant comprises a plurality of light elements and the cut portion of individual ones of the plurality of divided members is formed linearly, extending in a length direction of the divided member and is disposed over the plurality of light elements which are linearly arranged under the divided member in the length direction.

15. A light guide member as defined in claim 11, wherein the illuminant comprises a plurality of light elements and a plurality of the cut portions, including the cut portion, of the individual ones of the plurality of divided members is formed in a scattered arrangement at a specified pitch in such a manner that individual ones of the plurality of cut portions face individual ones of the plurality of light elements.

16. A light guide member as defined in claim 11, wherein the reflecting portion of individual ones of the plurality of divided members reflects the light toward the first end face of another divided member, and the light enters the other divided member through the light diffusion portion of the other divided member.

17. A planar light source device, comprising:
   the light guide member as defined in claim 11;
   the illuminant; and
   a substrate on which the illuminant is disposed at a specified pitch.

18. A display apparatus, comprising:
   the planar light source device as defined in claim 17 as a back light; and
   a display portion which receives light from the back light.

19. A display apparatus as defined in claim 18, wherein the display portion is a liquid crystal panel.

20. A light guide member as defined in claim 1, wherein the cut portion forms a groove on the bottom face above the illuminant such that the cut portion of the bottom face has the inclined face which extends toward the upper face of the light guide member.

21. A light guide member disposed over an illuminant and in which a light that has entered a bottom face of the light guide member from the illuminant is emitted from an upper face of the light guide member, comprising:
   a cut portion formed on the bottom face of the light guide member at a section of the bottom face located above the illuminant, wherein the cut portion of the bottom face has an inclined face which is disposed above the illuminant and extends toward the upper face of the light guide member,
   a reflecting portion on the inclined face of the cut portion of the bottom face, and which reflects the light emitted from the illuminant;
   a plurality of divided members adjacently disposed in such a manner that contiguous side faces face each other for forming the light guide member having a plate shape, a plurality of cut portions, including the cut portion, where individual ones of the plurality of divided members comprises individual ones of the plurality of cut portions;

a plurality of reflecting portions, including the reflecting portion, where individual ones of the plurality of reflecting portions are disposed on the inclined face of individual ones of the plurality of cut portions; and a light diffusion portion disposed on a first end face of individual ones of the plurality of divided members, the first end face being a contiguous side face of the contiguous side faces, wherein the cut portion of individual ones of the plurality of divided members is formed at an edge portion facing the first end face in the divided member, and the inclined face formed in the cut portion of individual ones of the plurality of divided members is formed from the bottom face toward the upper face in a direction of a thickness of the divided member in such a manner that the inclined face is connected to a second end face of the divided member.

22. A light guide member disposed over a plurality of illuminants and in which a light that has entered a bottom face of the light guide member from the plurality of illuminants is emitted from an upper face of the light guide member, comprising:

a plurality of divided members adjacently disposed in such a manner that contiguous side faces face each other for forming the light guide member having a plate shape, wherein first side faces opposite to each other in individual ones of the plurality of the divided members have a substantially parallelogram shape, and second side faces opposite to each other in individual ones of the plurality of divided members are inclined faces which extend from the bottom face to the top face of the light guide member and are inclined according to the substantially parallelogram shape of the first side faces, and each of the second side faces of individual ones of the plurality of the divided members are positioned over one of the plurality of illuminants; and a plurality of reflecting portions, where individual ones of the plurality of reflecting portions are disposed on the second side faces reflect light emitted from one of the plurality of illuminants.

23. A light guide member as defined in claim 22, wherein the second side faces opposite to each other in each of a plurality of the divided members have a substantially rectangular shape.

24. A light guide member as defined in claim 22, wherein the second side faces opposite to each other in each of a plurality of the divided members have a substantially parallelogram shape.

25. A light guide member as defined in claim 24, further comprising a plurality of lateral reflecting portions, which reflect the light emitted from the plurality of illuminants, disposed on at least one face of the first side faces opposite to each other in each of a plurality of the divided members.

26. A light guide member as defined in claim 25, wherein individual ones of the plurality of reflecting portions of the second side faces are disposed on individual ones of the second side faces opposite to each other in each of the plurality of the divided members, and individual ones of the plurality of lateral reflection portions are disposed on individual ones of the first side faces opposite to each other in each of a plurality of the divided members.

27. A planar light source device comprising:
the light guide member as defined in claim 24;
the plurality of illuminants; and
a substrate on which the plurality of illuminants are disposed,
wherein the plurality of illuminants are disposed in the range included in a projection region of the first side faces and a projection region of the second side faces of the plurality of the divided members.

28. A light guide member as defined in claim 22, further comprising a bottom reflecting portion, which reflects the light, disposed on the bottom face of the light guide member.

29. A light guide member as defined in claim 22, wherein individual ones of the plurality of reflecting portions of the second side faces are disposed on each of the second side faces opposite to each other in each of the plurality of the divided members.

30. A light guide member as defined in claim 22, wherein the plurality of illuminants are light emitting diodes.

31. A planar light source device, comprising:
the light guide member as defined in claim 22;
the plurality of illuminants; and
a substrate on which the plurality of illuminants are disposed.

32. A planar light source device as defined in claim 31, wherein the plurality of illuminants are disposed in the range included in a projection region of the second side faces of the plurality of the divided members.

33. A display apparatus, comprising
the planar light source device as defined in claim 31 as a back light; and
a display portion which receives light from the back light.

34. A display apparatus as defined in claim 33, wherein the display portion is a liquid crystal panel.

* * * * *